Sept. 19, 1961 C. J. VAN DALEN 3,001,018

TYPE PRINTING TELEGRAPH SYSTEM

Filed Nov. 14, 1958 15 Sheets-Sheet 1

CHRISTIAAN J. VAN DALEN

INVENTOR.

BY Hugh A. Kirk

ATTY.

Sept. 19, 1961 C. J. VAN DALEN 3,001,018

TYPE PRINTING TELEGRAPH SYSTEM

Filed Nov. 14, 1958 15 Sheets-Sheet 2

CHRISTIAAN J. VAN DALEN

INVENTOR.

BY Hugh A. Kirk

ATTY.

CHRISTIAAN J. VAN DALEN INVENTOR.

BY Hugh A. Kirk

ATTY.

CHRISTIAAN J. VAN DALEN
INVENTOR.

BY Hugh A. Kirk
ATTY.

CHRISTIAAN J. VAN DALEN
INVENTOR.
BY Hugh A. Kirk
ATTY.

CHRISTIAAN J. VAN DALEN
INVENTOR.
BY Hugh A. Kirk
ATTY.

Sept. 19, 1961 C. J. VAN DALEN 3,001,018

TYPE PRINTING TELEGRAPH SYSTEM

Filed Nov. 14, 1958 15 Sheets-Sheet 7

CHRISTIAAN J. VAN DALEN
INVENTOR.

BY Hugh A. Kirk
ATTY.

Sept. 19, 1961 C. J. VAN DALEN 3,001,018

TYPE PRINTING TELEGRAPH SYSTEM

Filed Nov. 14, 1958 15 Sheets-Sheet 8

CHRISTIAAN J. VAN DALEN
INVENTOR.

BY Hugh A. Kirk

ATTY.

CHRISTIAAN J. VAN DALEN
INVENTOR.
BY Hugh A. Kirk
ATTY.

CHRISTIAAN J. VAN DALEN
INVENTOR.

BY Hugh A. Kirk
ATTY.

CHRISTIAAN J. VAN DALEN
INVENTOR.
BY Hugh A. Kirk
ATTY.

CHRISTIAAN J. VAN DALEN
INVENTOR.

BY Hugh A. Kirk
ATTY.

CHRISTIAAN J. VAN DALEN INVENTOR.

BY Hugh A. Kirk

ATTY.

Sept. 19, 1961 C. J. VAN DALEN 3,001,018

TYPE PRINTING TELEGRAPH SYSTEM

Filed Nov. 14, 1958 15 Sheets-Sheet 14

CHRISTIAAN J. VAN DALEN INVENTOR.

BY Hugh A. Kirk

ATTY.

Sept. 19, 1961 C. J. VAN DALEN 3,001,018

TYPE PRINTING TELEGRAPH SYSTEM

Filed Nov. 14, 1958 15 Sheets-Sheet 15

CHRISTIAAN J. VAN DALEN
INVENTOR.
BY Hugh A. Kirk
ATTY.

3,001,018

TYPE PRINTING TELEGRAPH SYSTEM

Christiaan Johannes Van Dalen, Leidschendam, Netherlands, assignor to De Staat der Nederlanden, ten deze Vertegenwoordigd door de Directeur-Generaal der Posterijen, Telegrafie en Telefonie, The Hague, Netherlands Filed Nov. 14, 1958, Ser. No. 773,925
Claims priority, application Netherlands Nov. 21, 1957
12 Claims. (Cl. 178—23)

This invention relates to a telecommunication system with an automatic error correction device. More particularly, it relates to two-way radio telegraph type printing systems provided with means for correcting mutilated signals by repetition.

In existing radio type printing telegraph systems a so-called repetition cycle is transmitted by the receiving station on arrival of a mutilated signal from the sending or counter station. During this repetition cycle the printer at each station is blocked. In existing systems the duration of this repetition cycle is equal to the duration of four signals as disclosed in United States Patent No. 2,703,361 to Van Duuren. Immediately on detection of a mutilated signal at the receiving station, a request for repetition is sent to the counter station, but before this request for repetition has reached it, the counter station has transmitted some more signals. These signals may have been received correctly, but they are not printed because the printer is blocked. Such a blocking and repeat system is known as the Van Duuren system.

In a system such as the Van Duuren system, the distance between stations is assumed to be the maximum distance admissible between cooperating stations. This distance causes a phase shift or a time lag between the series of signals being transmitted and re-transmitted between the stations, so that, e.g., a one signal being transmitted from one station coincides with the interval separating the following two signals transmitted by the other station. Since this system is operated on a single channel basis, a four signal repetition cycle is required because of this phase shift. Thus, whenever a mutilated signal is detected and a correcting repetition cycle is transmitted back and forth between two communicating stations, a time equal to the duration of three signals, is lost from the time required to transmit the message. If a three signal repetition cycle were used with single channel systems, the admissible distance between cooperating stations would be reduced correspondingly.

The problem solved by this invention is to avoid the useless loss of signals properly received, but not printed during a repetition cycle for a mutilated signal.

Accordingly, it is an object of this invention to provide a more efficient, simple, effective, and economic system for type printing telegraphs.

It is another object of this invention to provide a mutilated signal repetition cycle not requiring a special code signal not a part of the message being transmitted.

Another object of this invention is to provide a type printing telegraph system wherein correctly received signals following a mutilated signal need not be re-transmitted after the mutilated signal is corrected.

Another object of this invention is to provide a type printing telegraph system which reduces, in both directions of the system, the time previously lost in correcting mutilated signals.

Still another object of this invention is to provide a type printing telegraph system having a shortened mutilated signal repetition cycle which may be used over the maximum distance admissible with existing systems.

Generally speaking, this invention of an improvement in type printing telegraph systems for radio traffic in two directions, which may be used over the maximum distance admissible in existing systems, comprises a means for correcting mutilated signals by repetition which results in shortened time of a correction cycle. The repetition means includes memory banks for storing signals correctly received in the interval between reception of a mutilated signal and reception of the corrected, previously mutilated, signal so that these correctly received signals will not be wasted. Also the request for repetition involves the repetition of a selected previously transmitted signal instead of the insertion of a special repetition indicating signal, thus saving more time for the transmission of the message information, as well as the division of the message for transmission over two channels instead of one so that alternate signals of the message are transmitted over different channels for further reducing time lost when mutilation occuring in one channel will not interfere with the transmission of alternate signals in the other channel. In conjunction with these storage or memory banks are switching means capable of disseminating the stored information embodied in the correctly received signals to a printer or recording means in the proper logical order after the receipt of the correction of a previously mutilated signal. Further, this invention comprises a method, in conjunction with the above apparatus, which enables continuous transmission of correctly received signals of a series while a previous signal of this series which has been received mutilated is in the process of being corrected by means of repetition.

The above mentioned and other features and objects of this invention and the manner of attaining them will become more apparent and the invention itself will be best understood by reference to the following description of embodiments of this invention taken in conjunction with the accompanying drawings, wherein.

Figure 6:
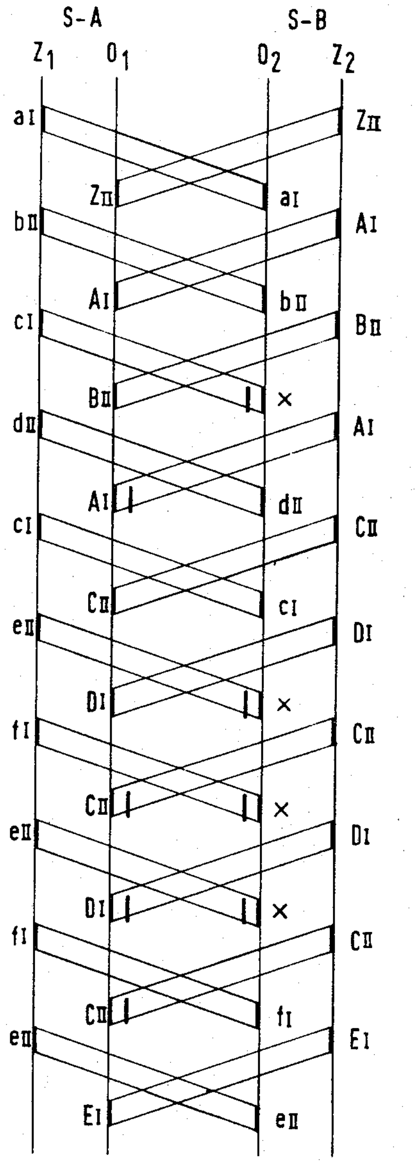
FIG. 6 illustrates, in schematic form, the time phased operating relationship of the system of FIG. 5 when mutilated signals X occur.
Figure 8:
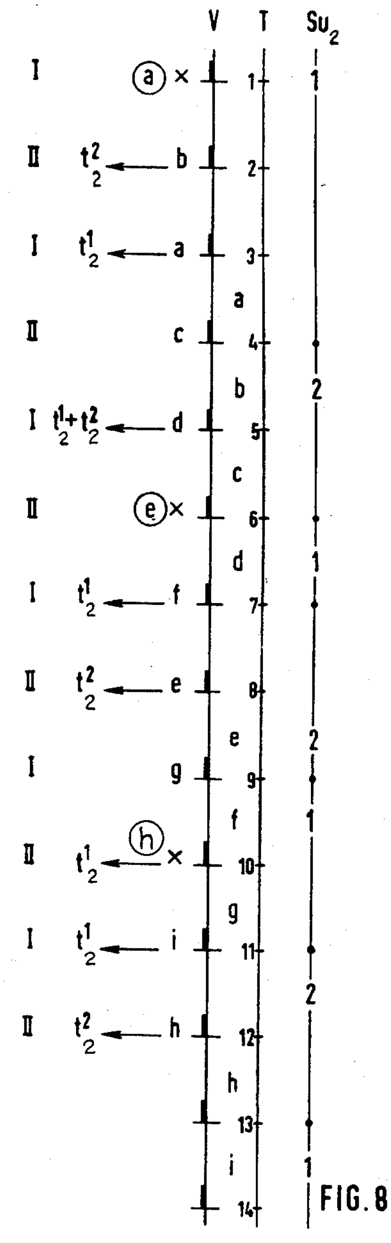
FIG. 8 illustrates an extended schematic time diagram similar to FIG. 7 of the operation of the telegraphic equipment at the message receiving station according to the system of this invention when mutilated signals are encountered.
Figure 8A:
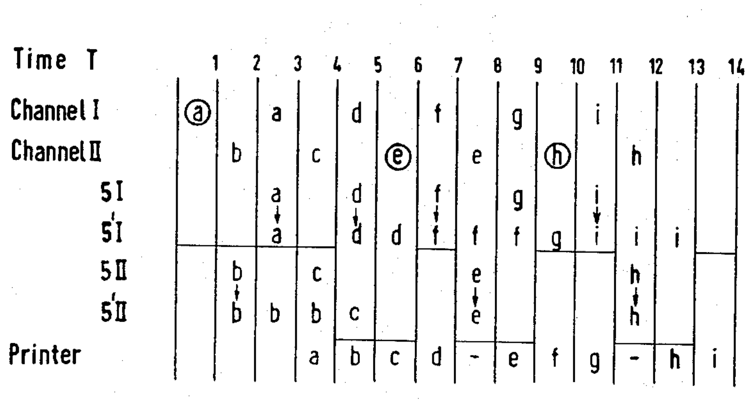
Figure 9:
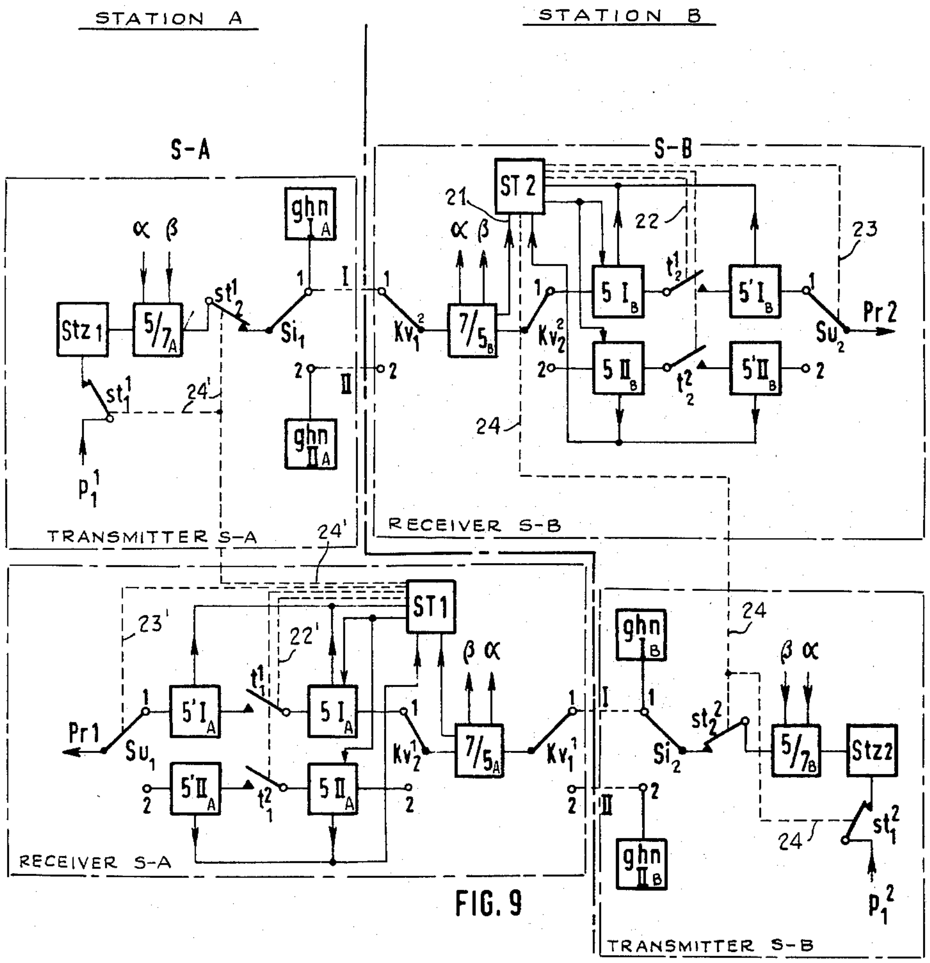
Figure 10:
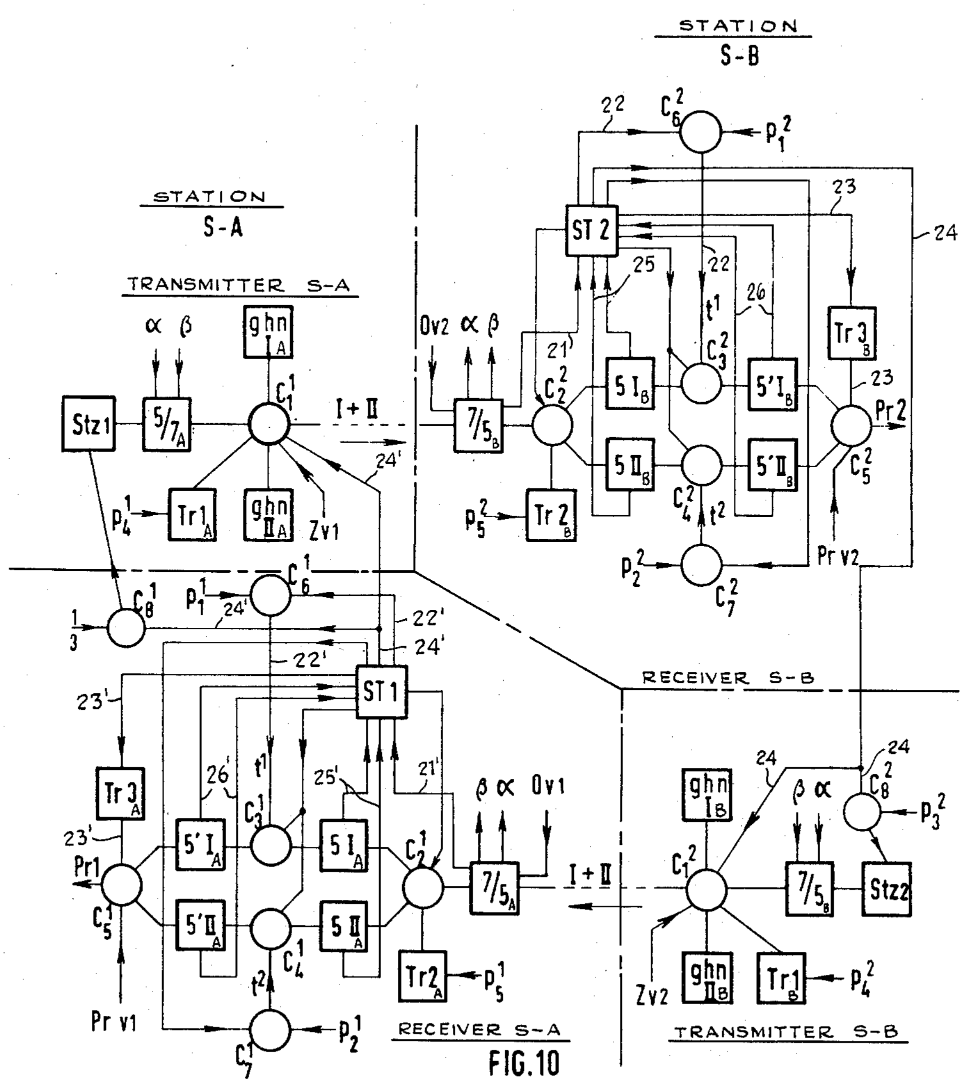
Figure 11:
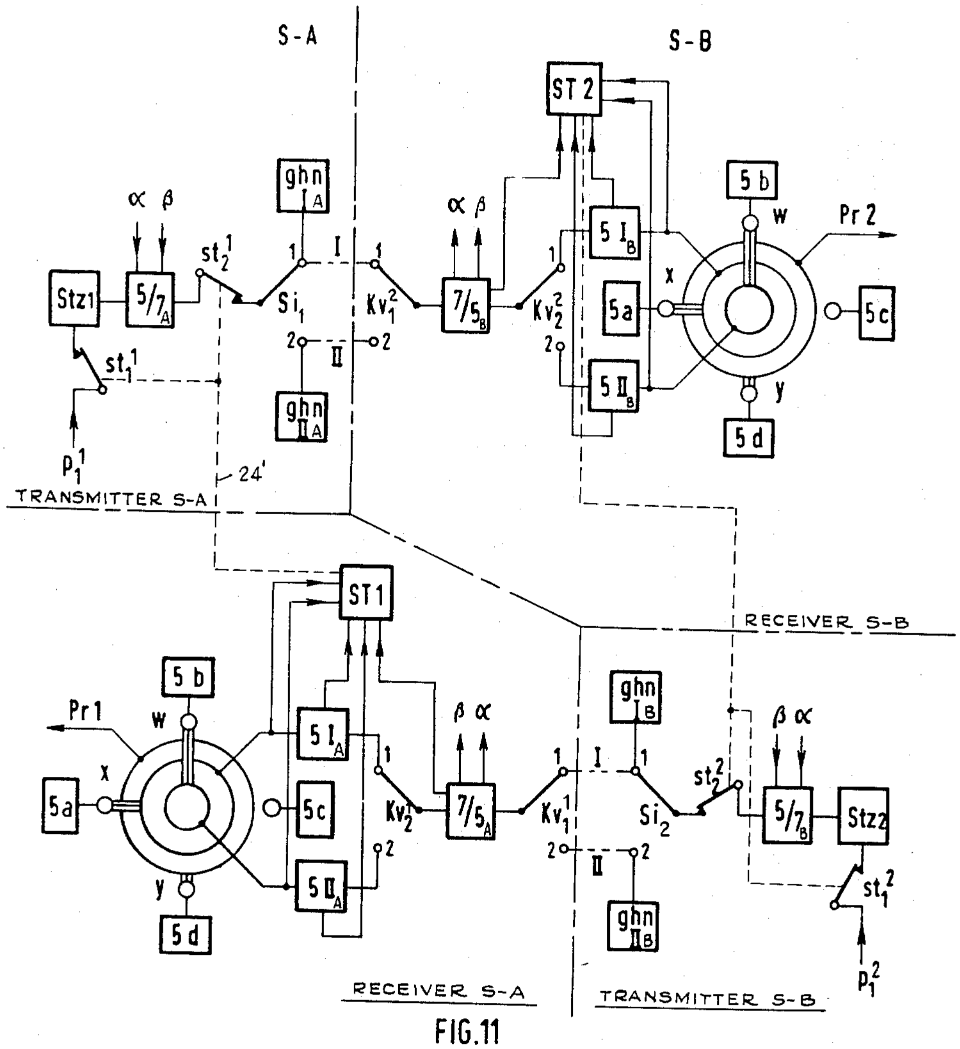
Figure 12:
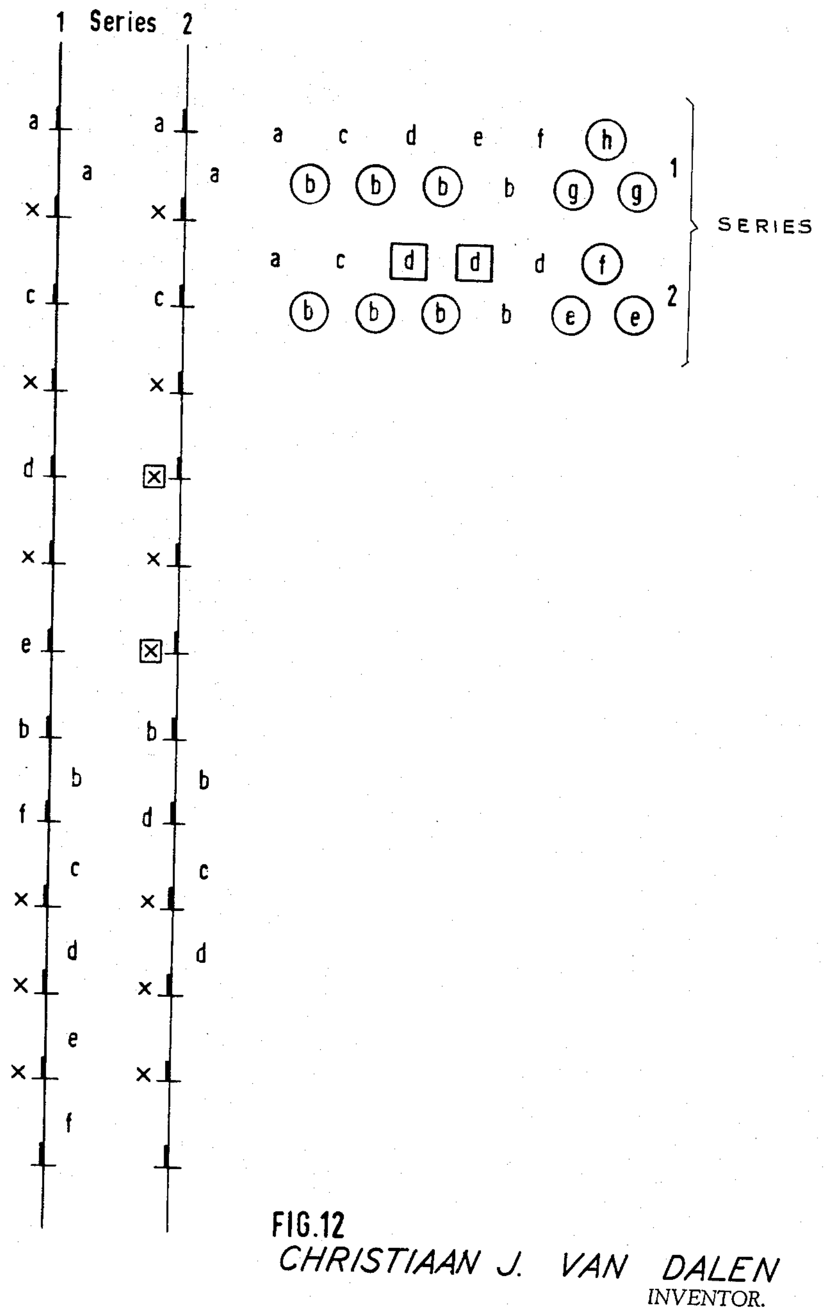
Figure 13:
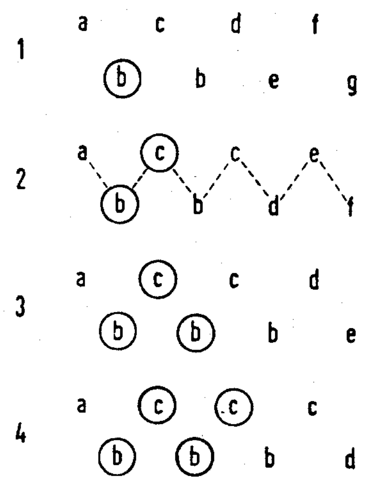
Figure 14:
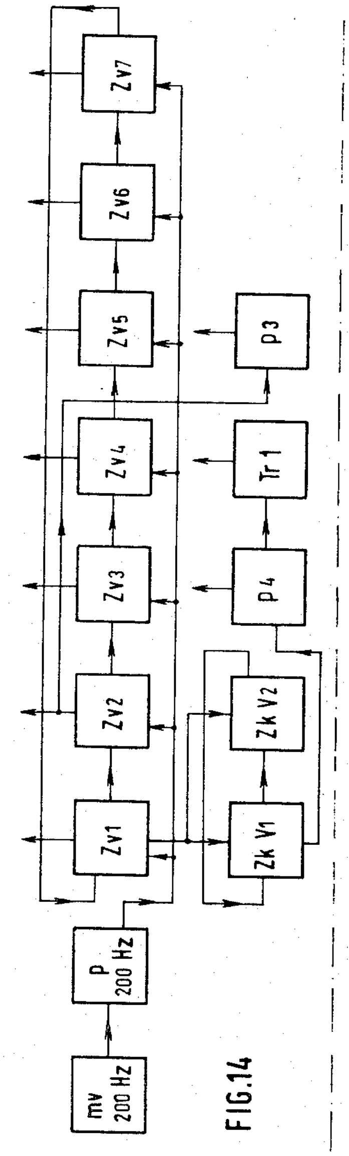
Figure 15:
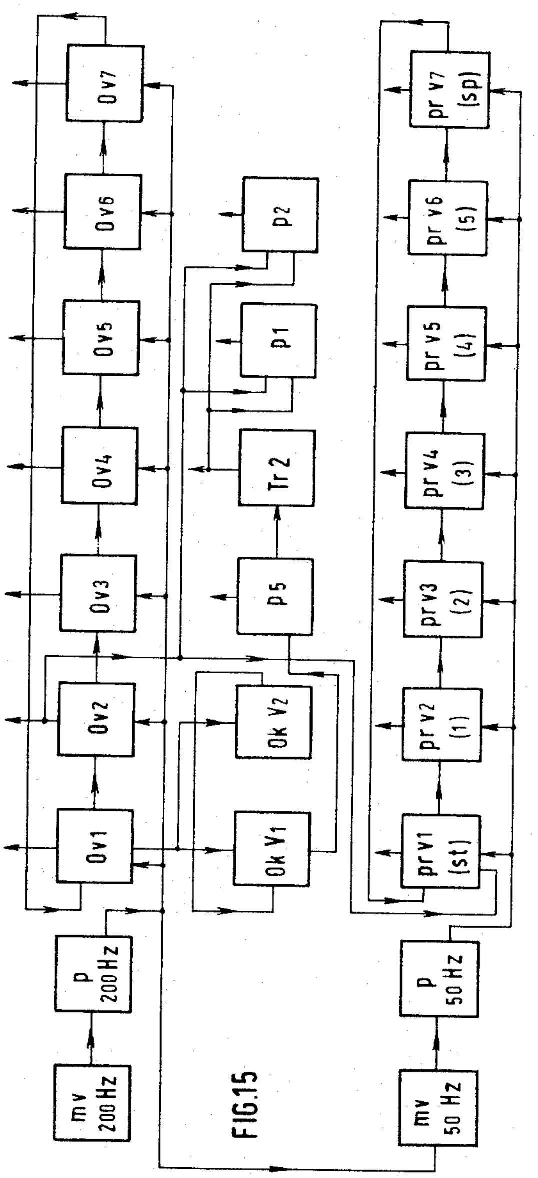
Figure 16:
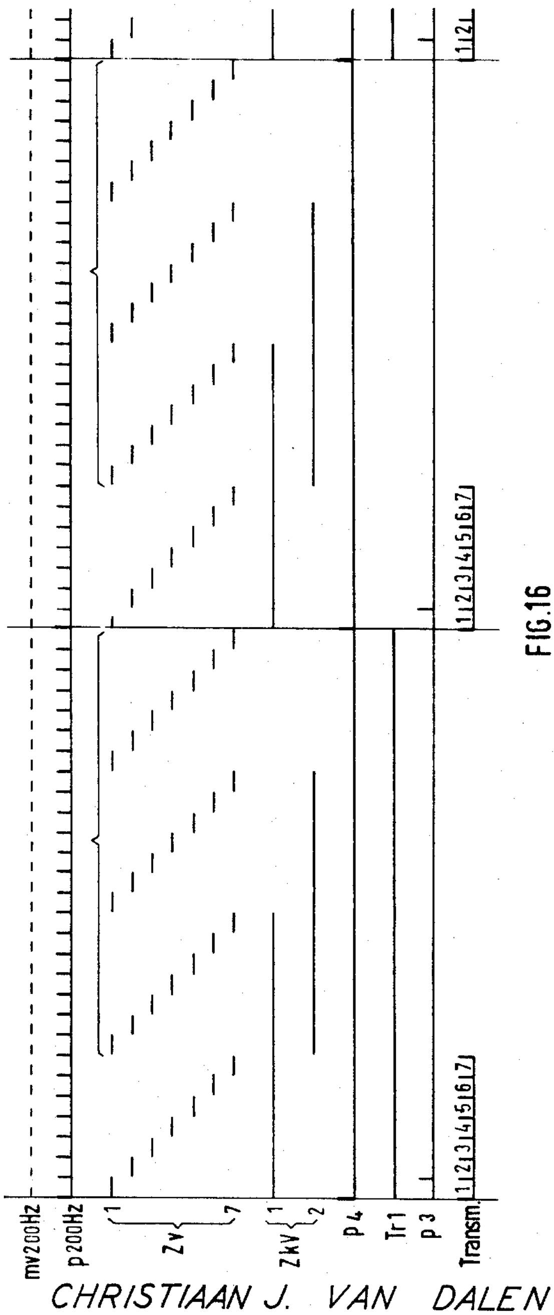
Figure 17:
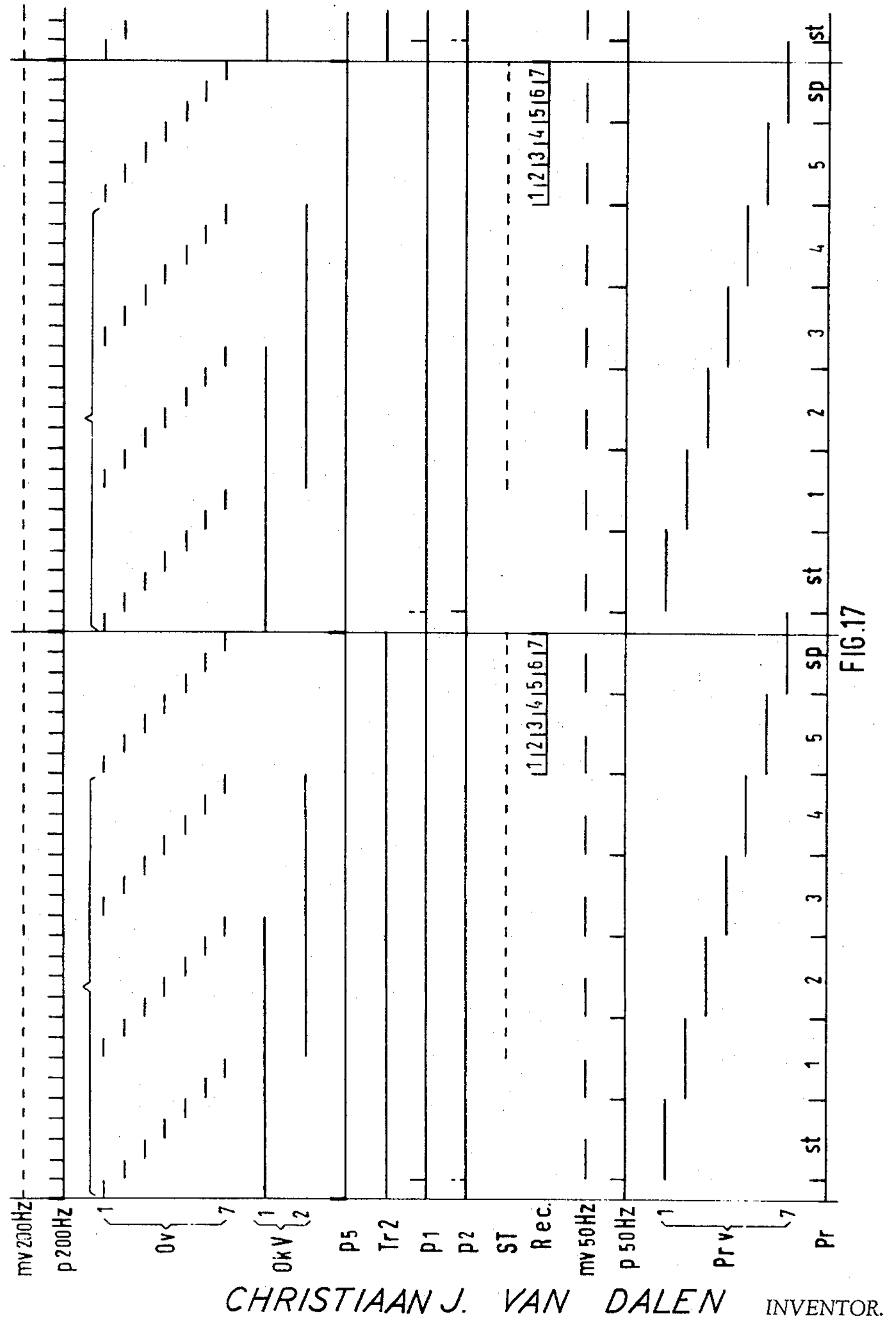
Figure 18:
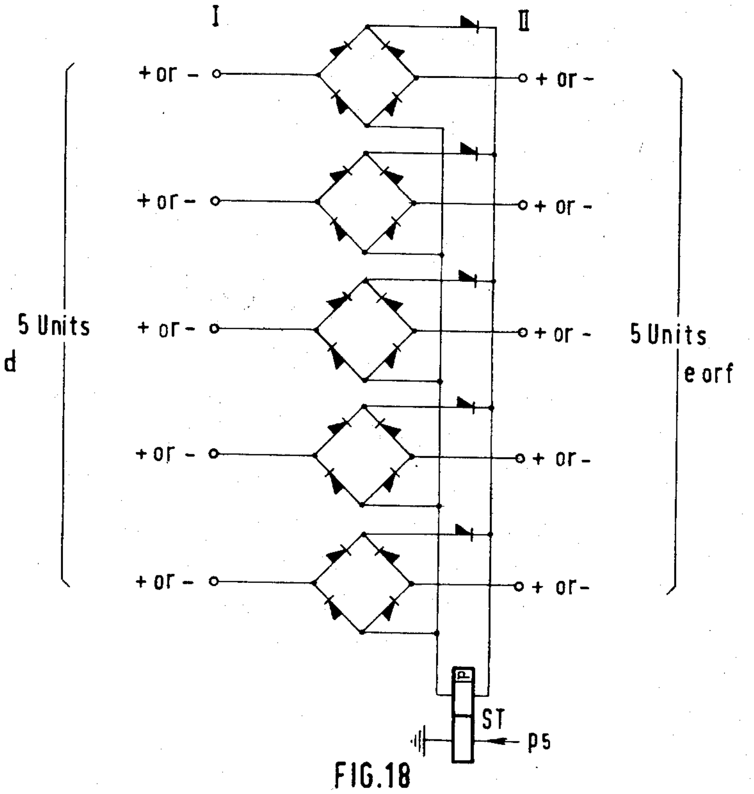

FIG. 8*a* illustrates the diagram of FIG. 8 in time oriented tabular form the sequence of received signals through the receiving station from the receiving apparatus proper, through memory banks, and to the printer when mutilated signals are received;

FIG. 9 illustrates a schematic block wiring diagram of a two-way communication apparatus at stations A and B in the system of this invention; specifically: a sending station transmitter (upper left), a receiving station and printer therefor (upper right), and a mechanically associated sending station (lower left), and its receiving station and printer (lower right) mechanically associated with the first sending station;

FIG. 10 illustrates the apparatus of FIG. 9 wherein electronic triggers have been substituted for electro-mechanical switches;

FIG. 11 illustrates apparatus according to FIG. 9 wherein the memory banks have been enlarged;

FIG. 12 shows detailed time diagrams of the signals transmitted by the installations according to FIGS. 9 and 10 by the method of this invention embodied in FIG. 6, without and with deliberate blocking of properly received signals when the memory banks are filled;

FIG. 13 shows schematically four different double series of alternative possibilities of signal disturbance which the system according to FIGS. 9 and 10 are capable of accepting and correcting;

FIG. 14 is a schematic block wiring diagram of the central pulse units of the message transmitting or sending station for an electronic system according to FIG. 10 of this invention;

FIG. 15 is a schematic block wiring diagram of the distributor circuits of the intelligence and memory portions of a message receiving station for an electronic system according to FIG. 10 of this invention which may be used in conjunction with FIG. 14;

FIG. 16 is a time diagram for the operation of the transmitter circuits of FIG. 14 for four channels;

FIG. 17 is a time diagram for the operation of the receiver circuits of FIG. 15 for four channels; and FIG. 18 is a wiring diagram of a comparator device which may be employed in the circuits of FIGS, 9, 10, and 11, which tests each signal received at either station to determine whether a repetition has been requested.

In describing the operation of this invention and the method of attaining the objects thereof, it is felt that a résumé of previously existing systems will best illustrate the manner in which the inventor has obtained his new concepts and will serve to illustrate the inventive features of the apparatus and thus illuminate the methods by which these objects are attained.

I. EXISTING TYPE PRINTING RADIO-TELEGRAPH SYSTEMS

Figure 1:
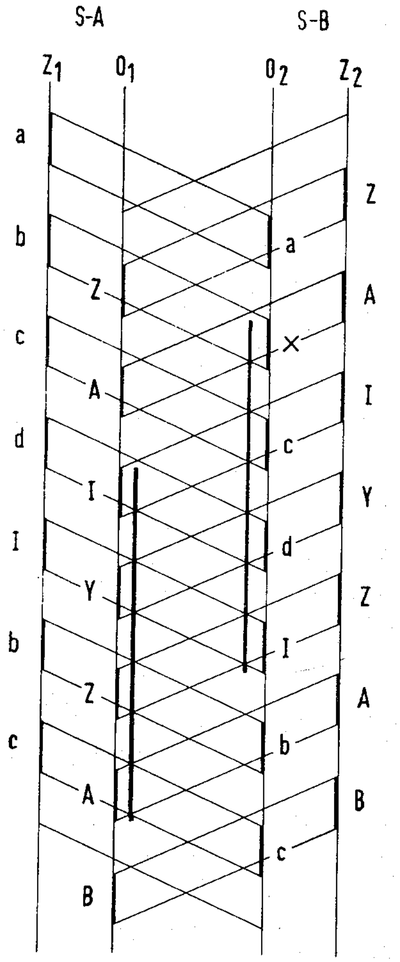
FIG. 1 shows, in schematic form, the time phased operation of spaced signals in existing systems of the Van Duuren type, time proceeding from the top downwardly.

Referring to FIG. 1, there is disclosed a schematic diagram, of vertical time varying base, illustrating the co-operating relationships of two stations using existing type printing radio-telegraph systems. The system illustrated in FIG. 1 is of the basic Van Duuren system. The vertical lines Z1 and O1 under heading S–A denote the transmitter and receiver-printer respectively of one station S–A, while the lines Z2 and O2 under heading S–B denote the signals sent out and received at the transmitter and receiver printer, respectively of the other station S–B communicating with station S–A. In this diagram time progresses downwardly.

Figure 2:
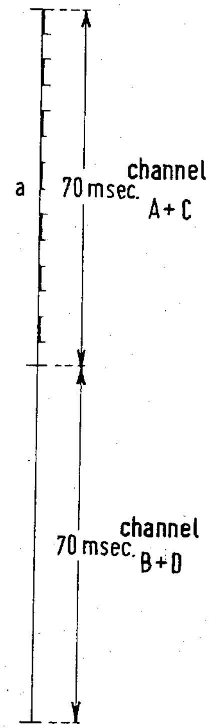
FIG. 2 shows the timed composition of the signals used in conjunction with the system of FIG. 1.

In conjunction with the explanation of FIG. 1 it will be advantageous to bear in mind the properties of the signal used in this system, which signal is described schematically in FIG. 2. The signal is divided into two 70 millisecond portions, the entire signal lasting 140 milliseconds. The first 70 milliseconds of the signal contain 7 signal pulses or bits spaced by equal intervals of radio-silence. These pulses comprise the information embodied in the overall signal.

To avoid confusion in interpreting the figures included with this specification, it should be understood that there are two separate and distinct messages being transmitted simultaneously over the systems which will be discussed. Thus, in FIG. 1, one message consisting of the series of information signals *a*, *b*, *c*, *d*, . . . is being sent by station S–A from a transmitter Z1 to a receiver O2 of station S–B. This message will be referred to as channel message A (originating at station S–A. At the same time a separate and entirely different message, consisting of the series of information signals Y, Z, A, B, . . . is being sent by station S–B from its transmitter Z2 to the receiver O, of station S–A. This message will be referred to as channel message B (originating at station S–B). This double exchange of messages must be considered particularly when referring to FIGS. 1, 3, 5, and 6, and applies generally to the entire specification.

Referring again to FIG. 1, the heavy portions of the vertical lines denote the first half of the signal disclosed in FIG. 2. The slanting lines of FIG. 1 denote the phase shift or time lag produced between the transmission and reception of a given signal, this time lag being a function of the distance over which the signal must travel.

In the Van Duuren system the message sending station S–A sends a signal "*a*." When this signal "*a*" has been received at the receiver O2 of station S–B, it is tested to ascertain whether the signal has been received properly or has been mutilated. If it has been properly received the next signal "A" from station S–B is transmitted. The sequence of the operations performed with the occurance of a mutilated signal, is illustrated in FIG. 1 for the reception of the letter "*b*" from station S–A. This letter "*b*" is broadcast at the first half of the second interval represented along line Z1, and the prior signal "*a*" is received at receiver O2 of station S–B at the same time the information portion of the signal "*b*" is being transmitted from station S–A. If there is anything wrong with the signal received at receiver O2, as in this case where "*b*" is mutilated as denoted by the X instead of a "*b*" at receiver O2, the transmitter Z2 of station S–B immediately notifies station S–A of such a reception. In this case station S–B sends a special mutilation indication or request for repetition signal I instead of the next signal "B" from station S–B. This special mutilation notice signal I is then received at receiver O1 at station S–A instead of the next intelligence or message signal "B." In the meantime the following two intelligence or "message signals" "*c*" and "*d*" have been transmitted from station S–A before station S–A knew a mutilation had occurred and a repetition is required. Thus after the transmission of any given signal from either of the stations, a period of three signal intervals, as represented in FIG. 2, has elapsed before this station is aware that this signal has been received mutilated at the other station of the pair.

In FIG. 1 it is assumed that stations S–A and S–B are separated by the maximum distance admissible with this type of system, the maximum distance being defined by the character of the signal and the amount of phase shift or time lag resulting between these two stations.

With the reception of a mutilated letter (X) or a special signal I, a repetition cycle commences at the station receiving such a signal. Immediately upon receipt of such a mutilated or special signal, the printer, associated with the receiving mechanism at that station is blocked so that the mutilated signal, or the special signal, and three subsequent signals, however correctly received, are blocked and not printed. This blocking of the printers is represented by the heavy vertical lines adjacent the vertical lines O1 and O2 in FIG. 1. Immediately upon receipt of the special signal I at the receiver O1 of station A, the transmitter of station S–A immediately confirms the receipt of the special signal I from station S–B by sending special signal I at the beginning of station S–A's repetition cycle. By the time the confirmation if signal I is received at O2, the letters "*c*" and "*d*" have been transmitted from transmitter Z1 and received correctly at receiver O2 of station S–B, but these letters "*c*" and "*d*" are not printed because its printer has been blocked pending the receipt of corrected information corresponding to the letter "*b*" which has been previously mutilated.

Once the special signal I calling for a repetition cycle has been broadcast, station S–B similarly broadcasts the three signals which it sent prior to the receipt of the special signal I. These signals, "Y," "Z" and "A," are obtained from a memory bank incorporated in the apparatus of the transmitters of the stations according to this Van Duuren system. A similar procedure is followed at station S–A, immediately after the broadcast of the confirmation of signal I, that is, the three signals previously transmitted by station S–A, namely letters "*b*," "*c*," and "*d*"; are re-broadcast. It is necessary that station S–A broadcast the three preceding letters since the first of these three signals, "*b*," is the signal which was received mutilated at station S–B. The letters "*c*" and "*d*" have been correctly received at station S–B, but have not been printed because of the prior receipt of the mutilated signal. Thus, it is required with this Van Duuren system, that, when a signal of the configuration disclosed in FIG. 2 is used, the repetition cycle at each station of the system lasts a time equal to that required to transmit four consecutive signals. The nature of the repetition cycle is dictated by the amount of phase-shift present in the system and this, as stated before, is in turn dictated by the distance between the cooperation stations S–A and S–B. It will be noted in this system that the signals "*c*" and "*d*" had correctly been received in station S–B but were not printed. This, in combination with the use of the special signal "I" calling for a repetition cycle, produces a loss of time equal to three signal intervals. This time lost is added to the overall transmission time of the message. Specifically, rather than losing 140 milliseconds, corresponding to one signal, the total time of operation lost at the printers at stations S–A and S–B amounts to 560 milliseconds, an increase of 420 milliseconds.

II. MODIFICATIONS OF EXISTING SYSTEMS

Figure 3:
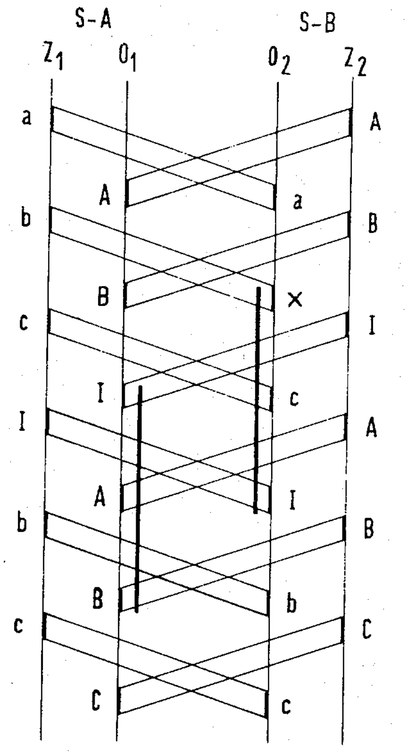
FIG. 3 shows, in schematic form, the time phased operation of compacted signals in a modification to the basic Van Duuren system.
Figure 4:
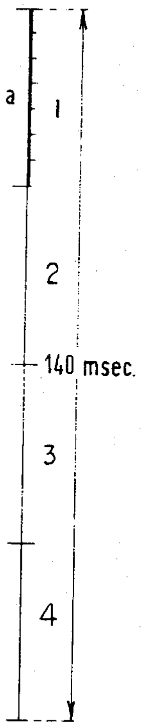
FIG. 4 shows the composition of the signals used in conjunction with the system of FIG. 3.

In attempting to reduce the time lost for the transmission of a message because of the repetition cycle, the modification illustrated in FIG. 3 was derived. In this case the signal has the characteristic described in FIG. 4. The overall period of the signal interval remains 140 milliseconds, but in this case the information is transmitted in the first 35 milliseconds, or the first quarter, of this interval, and the information elements or bits are adjacent each other and not spaced, each lasting five milliseconds. In FIG. 3, assuming that the distance between stations S–A and S–B remains the same, the time of the repetition cycle according to the extra heavy vertical lines along lines O1 and O2 in FIG. 3, is reduced the time for the transmission of three instead of four signals. Also, because of the properties of the signal being transmitted in this case, the information transmitted in a given interval by the transmitter Z1 of station S–A is received within this same interval at the receiver-printer O2 of station S–B. Hence the repetition demand signal of station S–B, in the case of a mutilated signal at O2, will trail the information or message sending cycle of station S–A by only one interval.

As in FIG. 1, the signal "*b*" is received in a mutilated condition at the receiver O2 of station S–B. Immediately upon receipt of such a mutilated signal, the printer at station S–B is blocked as represented by the heavy vertical line adjacent the vertical line O2, and it remains blocked during the three interval repetition cycle. Also, as in FIG. 1, the repetition cycle consists first of a special demand or repetition signal I which is transmitted immediately after receipt of the mutilated signal "*b*" is received and detected. This is received in the fourth period of the same signal interval at receiver O1. Station S–A immediately transmits a recognition or confirmation of the special demand signal I, instead of the next signal "*d*," followed by the two preceding signals transmitted by Z1 of station S–A, namely "*b*" and "*c*."

Since the information transfer between stations S–B and S–A lags by only one cycle signal interval, by the time the special repetition request signal I has reached station S–A, from station S–B where the mutilation was detected, the information signal "*c*" has been received correctly at station S–B, but it has not been printed because the printer at station S–B has been blocked. Following the transmission of the special signal I from transmitter Z2 of station S–B, the two preceding signals transmitted from this station, name, "A" and "B," are retransmitted to station S–A. The information signals, "*b*," "*c*," "A" and "B," transmitted during the repetition cycle are drawn from memory banks at the respective transmitters.

The special repetition demand signals I do not belong to the messages being transmitted and are not printed at any time.

Thus it can be seen from FIG. 3 that in this modification the repetition cycle lasts for an interval corresponding to three signals. The time lost has been reduced as against that lost in the system described in FIG. 1 by time amounting to 140 milliseconds, but still the properly transmitted signal "c" has to be repeated. This time is entirely lost in addition to the time lost in transmitting the repetition special signal I. How can the repetition of a proper received signal during the repetition cycle be avoided, and, furthermore, how can the time lost through the use of the special signal I be avoided? The apparatus and method embodying this invention are results obtained in answering these considerations.

III. A NEW TRANSMISSION SYSTEM

(*a*) *The transmission and repetition pattern*

Figure 5:
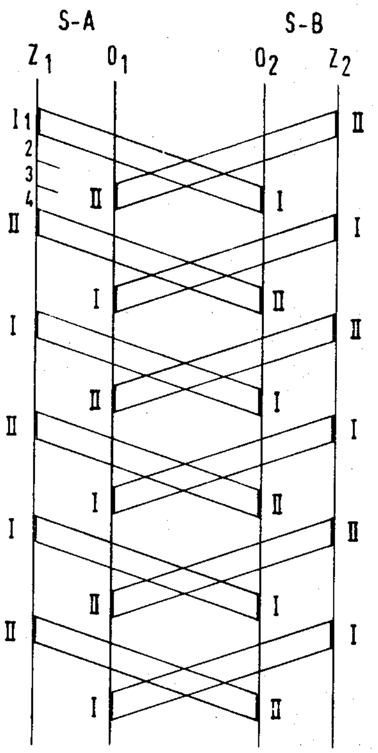
FIG. 5 illustrates, in schematic form, the time phased normal operating relationship of the system of dividing alternate signals of a message between two channels I and II as embodied in this invention.

In the system of FIGS. 5 and 6 it is to be understood that the messages, symbolized by the small letters *a*I, *b*II, *c*I, . . ., being transmitted by station S–A are not correlated in any logical means with the information, as represented by the capital letters ZII, AI, BII . . ., being transmitted by station S–B. In reality there are two separate and distinct messages being sent simultaneously in opposite directions.

FIG. 5 illustrates a system of transmission of messages by type printing radio-telegraphy according to this invention. The signal transmitted is the same as that disclosed in FIG. 4 used in the modification described previously in FIG. 3. One of the new features produced in this invention is the use of two channels for one message in which the successive signals of the message are alternately sent on different channels. These channels are designated by the Roman numerals I and II in FIG. 5. The two communicating stations are again designated as stations S–A and S–B having respectively, transmitters Z1 and Z2 and the receivers-printers O1 and O2. Thus one signal is transmitted at transmitter Z1 in channel I and the next signal transmitted from transmitter Z1 is in the alternate channel II, and the subsequent signal transmitted from transmitter Z1 is in the former or I channel, and so on throughout the operation of this system, the signals of a message alternate between these two channels. FIG. 5 illustrates the normal operation or trouble free operation of this new system.

FIG. 6 illustrates the operation of this system when mutilated signals are encountered. At station S–A signal "*a*" is transmitted from transmitter Z1 to channel I. At the same time station S–B is transmitting signal "Z" of a different message over channel II. After transmission of "*a*" through channel I at transmitter Z1, the information signal "*b*" is transmitted over channel II of station S–A. This is received properly at station S–B just before signal "*c*" is broadcast on the former or first channel I from transmitter Z1. Signal *c*I is not received properly at receiver O2. The X adjacent vertical line O2 signifies that the signal *c*I has been received in a mutilated condition. The solid vertical bar in conjunction with the X signifies that printer at receiver O2 has been blocked and that nothing is printed by this printer at this time. A demand or request is made to station S–A for a repeat of the signal "*c*" which has been received mutilated at station S–B. This request is accomplished by transmitting the last signal which was transmitted by station S–B over the channel in which the mutilated signal has been detected (channel I). This signal is AI and is taken from a memory bank which is a part of the transmission apparatus of this channel (see $ghnI_A$ of FIG. 9). When this repeat signal has been received in receiver O1, it is immediately compared with the last signal received over this channel (I); if it is identical to the last received signal the printer is immediately blocked and this duplicate signal is not printed. This is shown by the solid vertical bar opposite AI of vertical line O1. When the intelligence apparatus attendant to receiver O1 at station S–A has discerned a request for a repeat, transmitter Z1 retransmits the last signal sent over this channel I in which the duplication has been detected (*c*I), which is the signal which was received mutilated at receiver O2 and now is received correctly. The apparatus wherein this procedure is done will be described later.

From FIG. 6, the information corresponding to signal *d*II is shown to have been received correctly over channel II prior to the correct receipt of repeated signal *c*I over channel I. This inversion of the logical order and the correction of this inversion will be described later. Disregarding temporarily the inversion of signals *c*I and *d*II at receiver O2, let us examine the further operation of the system with regard to the two separate and distinct series or channels of signals being transmitted by stations S–A and S–B.

Signal *e*II is transmitted from transmitter Z1 following the repetition of signal *c*I over channel I. This signal *e*II is received at receiver O2 in a mutilated condition. The mutilated condition is detected by an intelligence unit at receiver O2 and the printer of receiver O2 is automatically blocked. To signal a request for a repetition, the last signal transmitted by this channel, namely *c*II, is transmitted to station S–A. This is received and the sensing device at receiver O1 automatically compares this signal with the signal last received over this channel. Since these two signals are identical, the sensing device of receiver O1 at station S–A automatically blocks its printer and re-broadcasts the last transmitted signal sent from transmitter Z1 by channel II, namely *e*II. Again this information (*e*II) is shown in FIG. 6 to be received in a mutilated condition at receiver O2. Between the first and second transmission of *e*II, signal *f*I has been transmitted by channel I from transmitter Z1 to receiver O2. This also has been received in a mutilated condition. The sensing apparatus at receiver O2, in addition to automatically blocking the printer of receiver O2, orders the transmission of the last transmitted signal of channel I from transmitter Z2 to receiver O1; in this case the signal is DI. The sensing device associated with channel I at receiver O1 tests the incoming signal (DI) with the last received signal (DI) of this channel, and finding that the two are identical, blocks the printer of receiver O1, and transmits the last transmitted signal of this channel, namely *f*I. This repeat of *f*I is received correctly at receiver O2. Returning again to the mutilated receipt of the repetition of signal *e*II, the sensing device at receiver O2 tests it, and orders the transmission of the last signal transmitted by channel II. This signal is again *c*II. Receiver O1 discerns that CII is the same as the last received signal encountered in channel II and again transmits *e*II, the last signal transmitted over channel II at transmitter Z1 of station S–A. This signal *e*II is received correctly at receiver O2 of station S–B, and the errors now have been completely corrected so that transmission may proceed normally until another mutilation is detected.

Thus from FIG. 6, the signals are received in the following sequence: *a, b, d, c, f, e* indicated beside the vertical line O2. This is not the sequence in which the signals have been transmitted and measures must be taken to read the signals in the correct sequence to the printers. This lack of regularity in the series of letters result from:

(1) the errors *cx, ex, fx,* and *ex*;

(2) their signalling, the first fault being signalled by doubling the A, the second by doubling the C, the third by doubling the D, and the fourth by doubling the C again; and (3) their correction.

*(b) Reception of signals at the receiving station printer*

Figure 7:
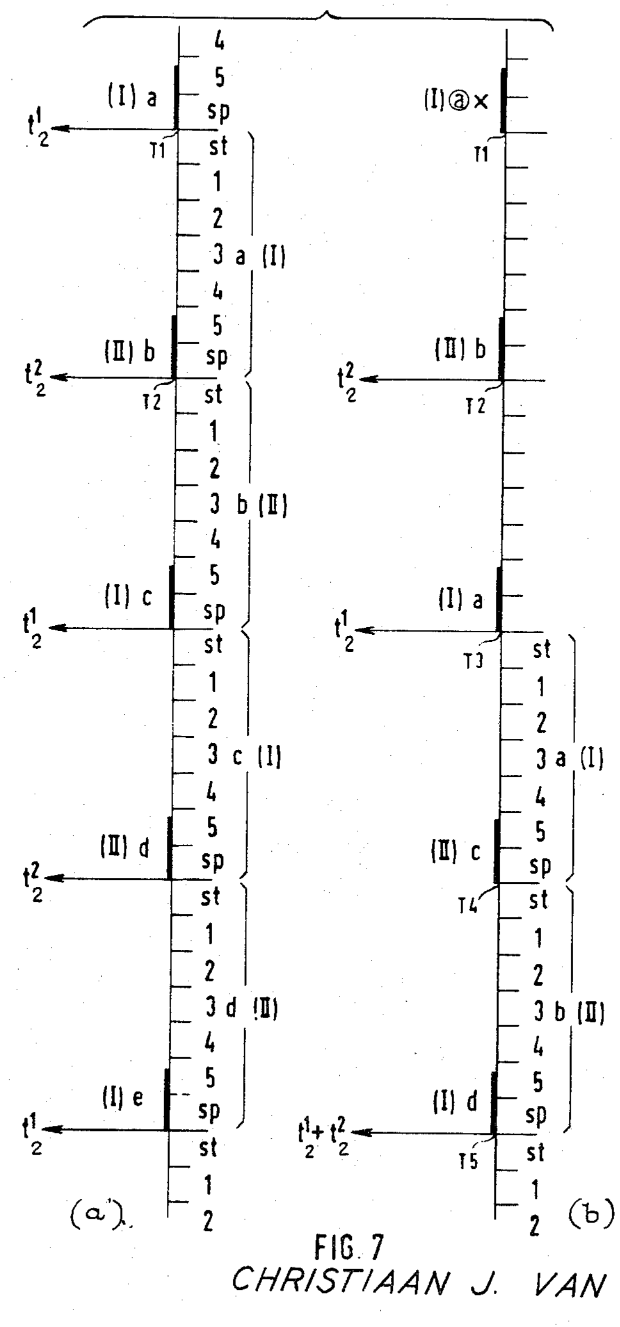
FIG. 7 illustrates two vertical schematic time diagrams of the working of the telegraphic equipment at the message receiving station according to the system of this invention; without and with mutilated signal reception.

In the discussion immediately preceding, the method of this invention by which signals are transmitted was described. Before proceeding with the detailed explanation of the apparatus contained at the various stations of this system, a more detailed consideration of the reception of the signals at the receiving station is in order so that the function of the circuitry at the sending and receiving stations may be better understood when discussed later. FIGS. 7(*a*) and (*b*), 8, and 8*a* should be referred to during this discussion.

In FIGS. 7(*a*) and (*b*), when a signal is received and is sent to the printer at the beginning of the next signal interval, the signal which is sent to the printer has a start element (*st*), five intelligence elements (1, 2, 3, 4, 5) corresponding to the elements of the signal transmitted between stations A and B, and a stop element (*sp*).

FIG. 7 part (*a*) illustrates undisturbed reception of signals at station S–B over the two broadcasting channels (I) and (II), used to transmit any given message. Before the moment T1, signal "*a*" is received over channel I and is printed in the interval between moments T1 and T2. Before moment T2 the signal "*b*" is received over channel II and is printed during the following interval, between T2 and T3. (The brackets spanning the intervals T1–T2, T2–T3, etc. denote the printing of the information previously received. The notations $t^1_2$, and $t^2_2$ opposite the arrows at the left of part (*a*) of FIG. 7 denote switches being closed in the proper memory banks (see also FIG. 9); the meaning of which will become more apparent later.)

The right hand vertical time diagram (*b*) in FIG. 7 illustrates the situation where a mutilated signal is received at station S–B. In this case, just preceding the moment T1, signal "*a*" is received mutilated over channel I (denoted by (I) @ X). Thus nothing is printed between moments T1 and T2, as illustrated by the absence of a vertical bracket to the right of the right hand vertical line. Just preceding moment T2, signal "*b*" is received over channel II. This letter may not be printed, however, because the "*a*" must be printed first, but this "*a*" has not yet been received correctly. Therefore, the "*b*" is stored temporarily in a memory device. After the "*b*" is received, the "*a*" arrives undisturbed via channel I just before the moment T3. It is provided with a start element *st*, a stop element *sp*, and five intelligence elements, which are shown between moments T3 and T4 at the right of the vertical line. This signal *a*I is sent to the printer. Then "*c*" arrives correctly via channel II just before moment T4. It may not be printed, however, and is stored in a memory to be printed between moments T5 and T6; since first the "*b*" is printed as shown between moments T4 and T5 at the right of the vertical line. Then, before moment T5, "*d*" is received correctly over channel I, but it may not be printed yet because "*c*" received over channel II must be printed first. Accordingly "*d*" is stored in a memory device and is printed after "*c*."

FIG. 8 provides an illustration similar to those of FIG. 7(*a*) and (*b*), but is extended over a greater period of time and incorporates somewhat different detail. In FIG. 8, the upper five intervals correspond to part (*b*) of FIG. 7. At the extreme left of FIG. 8, the Roman numerals I and II denote the channels over which the signals are received. The vertical line V denotes downwardly in time the sequence of arrival of the signals from station A. Vertical line T is divided into intervals, the numbers of which denote the time intervals of the receiving operations. The vertical line $Su_2$ relates to the position of the printer distribution switch as disclosed in FIG. 9 and will be better understood when FIG. 9 has been described. Again the notations $t^1_2$ and $t^2_2$, in conjunction with the arrows, have reference to the position of switches $t^1_2$ and $t^2_2$ of FIG. 9 in the memory banks. (It will suffice at this point to state that each channel at station S–B has a two-stage memory bank, the two stages of channel I memory system being connected by switch $t^1_2$, and the two stages of the memory bank associated with channel II being connected by switch $t^2_2$.) The encircled letters followed by the X's have been received mutilated.

In describing the operation of part (*b*) of FIG. 7 it was stated that between moments T5 and T6 the signal "*c*" was printed, and that just before moment T5 the letter "*d*" was received by channel I. This signal is printed between moments T6 and T7. Just preceding moment T6, signal "*e*" is received mutilated (X) over channel II; thus the only thing that happens in interval T6 to T7 is the printing of letter "*d*," as stated before. Before moment T7, letter "*f*" is received over channel I, but cannot be printed because letter "*e*" has not been received correctly. Letter "*f*" is stored in a memory device pending correct receipt of letter "*e*," and nothing is printed during this interval. Just preceding moment T8, letter "*e*" is received by channel II and is printed between moments T8 and T9. Just preceding moment T9 letter "*g*" is received over channel I, but letter "*f*" has not yet been printed; thus letter "*g*" is stored in a memory device of channel I. Between moments T9 and T10, the letter "*f*" is taken from the memory device and printed. Just preceding moment T10, the letter "*h*" is received mutilated by channel II. Between moments T10 and T11, letter "*g*" is taken from memory and printed. Prior to moment T11, letter "*i*" arrives correctly over channel I, but nothing is printed because letter "*h*" has not yet been received correctly. Thus "*i*" is stored in a memory device of channel I. Prior to moment T12 the letter "*h*" is received correctly and is printed in the interval between moments T12 and T13. Subsequently, in the interval between moments T13 and T14, letter "*i*" is taken from its memory device and is printed.

FIG. 8*a* shows, FIG. 8 in tabular form, the sequence of operations at the receiving portion of station S–B. The first horizontal line, headed Time T, shows the time intervals 1 through 14. The horizontal line directly below shows the signals received over channel I, and the next horizontal line shows the signals received over channel II, the letters in circles being received mutilated. The next four horizontal lines headed 5I, 5'I, 5II, and 5'II denote the memory devices of channels I and II respectively (see FIG. 9). In the horizontal lines, the vertical arrows denote that during the intervals shown transfer of information is occurring, for instance; between moments 2 and 3 letter "*a*" is being transferred from the first memory device 5I to the second memory device 5'I of the storage bank of channel I. The eighth horizontal row shows the printing of the letters as they are drawn from the storage banks immediately preceding.

Reiterating the procedure of FIG. 8 as applied to FIG. 8*a*, before moment T1 letter "*a*" is received mutilated in channel I. Before moment T2 letter "*b*" is received in channel II and is immediately sent via memory device 5II to memory device 5'II. Before moment T3 letter "*a*" is received correctly in channel I and is immediately sent via memory device 5I to memory device 5'I, letter "*b*" being retained in memory device 5'II. Before moment T4 letter "*c*" is received in channel II and is stored in the first memory device 5II of channel II, memory device 5'II being occupied by "*b*"; letter "*a*" being printed in the interval between moments T4 and T5. Before moment T5 letter "*d*" is received in channel I and is transferred through memory device 5I to memory device 5'I, memory device 5'I having been emptied of letter "*a*" when it was printed in the previous interval. In this same interval, between moments T4 and T5 letter "*c*" is transferred from memory device 5II to memory device 5'II and letter "*b*" is printed. Before moment T6 letter "*e*" is received mutilated in channel II and letter "*c*" is printed after being drawn from memory device 5'II; letter "*d*" is retained in memory device 5'I. Before moment T7 letter "*f*" is received correctly over channel I and is transferred through memory device 5I to memory device 5'I; letter "*d*" being drawn from memory device 5'I and printed in this interval. Correction of letter "*e*" is received prior to moment T8 and is sent via memory device 5II to memory device 5'II; letter "*f*" being retained in memory device 5'I; in this interval no letter is printed since a correctly received letter has to be printed in the following interval. Before moment T9 letter "*g*" is received correctly over channel I and is stored in memory device 5I, memory device 5'I being loaded with letter "*f*," and in this interval letter "*e*" is printed after being taken from storage in memory device 5'II. Prior to moment T10 letter "*h*" is received mutilated via channel II, letter "*g*" is transferred from memory device 5I to memory device 5'I and letter "*f*" is printed after being drawn from memory device 5'I. Prior to moment T11 letter "*i*" is received correctly via channel I and is stored in memory device 5'I, letter "*g*" being withdrawn at this time from memory device 5'I and printed. Letter "*h*" is received via channel II prior to moment T12 and is passed directly to memory device 5'II, no printing being accomplished in this interval because of the sequential nature of the reception and printing. Prior to moment T13 no letter is received over channel I, but letter "*h*" is read from memory device 5'II to the printer. In the interval between moments T13 and T14, letter "*i*" is withdrawn from memory device 5'I and is printed. Thus the inversion which was noted earlier, that is, the inverted sequence *a, b, d, c, f, e, g, i, h* has been corrected and the letters have been printed in their normal order *a, b, c, d, e, f, g, h, i.*

The horizontal lines between 5'I and 5II and between 5'II and the printer row denote the position of switch $Su_2$ (as disclosed in FIG. 9); the significance of these horizontal lines will become apparent as FIG. 9 is described.

(*c*) *Transmitting and receiving station operations*

FIG. 9 shows in schematic form the devices of this invention connected to the transmitting or sending and the receiving circuits at each of a pair of communicating stations S–A and S–B. The upper left dotted rectangle is the transmitting portion of station S–A while the lower right dotted rectangle is the transmitting portion of station S–B. The upper right dotted rectangle is the receiving and printing portion of station S–B, while the lower left dotted rectangle is the receiving and printing portion of station S–A. Considering the two upper rectangles in FIG. 9, the order of operation of transmitting and receiving a message may be described briefly without consideration of the nature of the messages being transmitted, as has been described in detail previously.

Block *Stz*1 is the keyer connected via a switch $st^1_1$ to a tape reader $p^1_1$ of the transmitter of station S–A, which keyer *Stz*1 delivers the signals to be transmitted to a code converter $5/7_A$. This converter $5/7_A$ converts the signals from the five unit code (Baudot), in which the message information originates, into a seven unit code which is used for transmission of the signal from station S–A to station S–B. This conversion for transmission enables all the signals to exhibit the same mark/space ratio, namely, 3/4 for mutilation detection purposes. Via switch $st^1_2$ and switch $Si_1$, the signals are sent in succession, alternating between channel I and channel II as denoted by contacts 1 and 2 of switch $Si_1$.

Each channel has its own memory device $ghnI_A$ and $ghnII_A$, respectively, also connected respectively to contacts 1 and 2 of switch $Si_1$, in which memories the lastly transmitted signal of each of these channels is stored. These memory devices are of the regenerative withdrawal, override erase type so that a signal may be read out of the memory without erasing the contents of the memory. The dotted lines I and II which bridge these two upper rectangles represent the two channel transmission paths between the transmitter of station S–A and the receiver of station S–B.

The signals received at station S–B from station S–A are picked up at contacts 1 and 2 of switch $Kv^1_1$ which is always in synchronism with switch $Si_1$ of station S–A. Immediately upon receipt of a signal at station S–B, the signal is fed into a code converted $7/5_B$ where the seven unit code, used in transmission of the message between stations, may be converted back into the five unit code of the same form in which the message was originated. (The objects aimed at by this invention are realized by providing a storage device at the receiving end of the system as well as at the transmission end, so that it becomes possible to re-arrange the received signals. Moreover, the storage means thus provided at the receiving end are simpler, having five units rather than the seven units storage means for which they are substituted. These storage means, or memory devices which will be described below, allow a correct re-arrangement of the signals arriving after a mutilated signal has been received.)

From the code converter 7/5 of station S–B, the signal is sent in two directions; the first of these directions is via switch $Kv^2_2$ to the memory devices 5I and 5II of the storage banks associated with the two channels over which the signals are received; and the second of these directions is via connection 21 to a signal testing and comparing device $ST^2$, the comparing circuit of which is shown in greater detail in FIG. 18.

As a signal is received at station S–B, it is first tested in device ST2 to see if it has not been mutilated, that is, it has a constant ratio of mark and space elements (i.e. 3 and 4 or vice versa), and if it is not mutilated it is compared in device $ST^2$ with the previously received signal which is retained in that one of the storage devices 5I and 5II which is associated with the channel over which the incoming signal is received. If the incoming signal and the previously received signal are dissimilar, as determined by the sensing or testing and comparing device ST2, this device ST2 recognizes that the incoming signal if unmutilated or correct is, in itself, a new signal, and subsequent operations in the system proceed normally. If, however, the incoming signal is mutilated or if the incoming signal and the last previously received signal, as stored in the memory device for that channel are identical, then the sensing device ST2 orders the re-transmission of the last signal in that same channel which was previously sent from this station.

Referring again to a given incoming signal in channel I, after the incoming signal has been converted to a five unit code signal and sent to memory device $5I_B$, assuming it is a valid and correct signal in itself, it is immediately transferred to the second memory device $5'I_B$ in the bank by closing the switch $t^1_2$ between device $5I_B$ and $5'I_B$ operated by the sensing device ST2 through a connection 22. During the next signal interval this transferred signal will be further transferred to the printer $Pr2$ via switch $Su_2$, also controlled by device ST2 via a connection 23. If the incoming signal to station S–B from station S–A is the same as the signal stored in the corresponding channel storage banks of station S–B, the sensing device ST2 will detect this situation and recognize that repetition of a signal which has been received mutilated at station S–A is being requested. In such a case device ST2 informs the transmitter portion of station S–B, shown in the lower right rectangle, via connection 24, to transmit the signal which was previously transmitted over this channel. At the transmitter S–B this signal is withdrawn from the corresponding channel, memory or storage device, either $ghnI_B$ or $ghnII_B$. Since switches $Si_1$, $Si_2$, $Kv^1_1$, $Kv^1_2$, $Kv^2_1$ and $Kv^2_2$ are always in synchronism, the proper storage device will automatically be selected. If the device ST2 in station S–B detects a mutilated signal, the signal previously transmitted over this same channel is withdrawn from the proper storage device $ghnI_B$ or $ghnII_B$ in the corresponding transmitter, which is ordered via the connection 24, controlled by device ST2. From there this withdrawn signal is re-transmitted to station S–A where the sensing device ST1 at station S–A, as shown in the lower left corner of FIG. 9, by comparison detects this re-transmitted signal as identical with the signal previously transmitted in this channel and therefore knows it is a request for repetition and orders, via connection 24', that the transmitter at station S–A withdraw the proper signal from memory device $ghnI_A$ or $ghnII_A$ and re-transmit this signal to station S–B. Since switch $Su_2$ is not in synchronism with the $Si$ and $Kn$ switches in the system, but is controlled by means of the device ST2, it remains at its contact until a correct signal has been received and stored so that the stored signals are removed in the proper sequence. The operation of switch $Su_2$ can be seen according to the vertical line $Su_2$ of FIG. 8.

To further illustrate the specific operation of the circuit in FIG. 9 in case of a mutilation, reference is had to the sequence of reception of the specific example described in FIG. 8. Before time or moment T1 the letter "*a*" arrives mutilated by channel I. This is detected in testing device ST2 and as a result thereof nothing is stored in the memory devices and since this is the first signal received, nothing is sent to the printer $Pr2$. But a request for repetition of the letter "*a*" is initiated through connection 24 to transmitter S–B to repeat its last signal transmitted in channel I which is still stored in $ghnI_B$, so as to signal by this repetition to station S–A that the letter "*a*" still stored in memory device $ghnI_A$ must be repeated before it is normally wiped out at time T3 by the next new signal for channel I from station S–A. The characteristics of these memories (*ghn* series and 5 series) throughout the system are such that information may be withdrawn from the memory bank and yet be retained in the memory bank, and that feeding a new signal into a memory bank erases the previous signal and stores the new information therein.

Before time T2 the letter "*b*" arrives correctly at station S–B by channel II, and is stored immediately in memory device $5'II_B$ passing through the first memory device $5II_B$ since switch $t^2_2$ is closed under the control of ST2. This letter "*b*" may not yet be sent to the printer $Pr2$ because switch $Su_2$ is still in position 1 pending the receipt of corrected letter "*a*." Since in channel II letter "*b*" had been received correctly, the sequence of the letters is dangerously near being upset (see FIG. 8*a*) because normally the sequence of printing of the letters is as follows: the first letter in upper row; first letter in lower row; second letter upper row, second letter in the lower row, etc. Before moment T3 the letter "*a*" arrives correctly via channel I and passes immediately via memory $5I_B$ to $5'I_B$ because switch $t^1_2$ is now closed under the control of testing device ST2. This letter "*a*" may now go to the printer $Pr2$ between moments T3 and T4 since switch $Su_2$ is still in position 1.

At the next step or moment T4, switch $Su_2$ is changed over to position 2 under control of device ST2 and reads the "*b*" from $5'II_B$ to the printer $Pr2$. However, before the moment T4, the letter "*c*" arrives correctly via channel II and is stored immediately in memory device $5II_B$, but is not passed to memory device $5'II_B$ because switch $t^2_2$ is open under control of device ST2 since this memory is still occupied by letter "*b*," which, as mentioned before, is to be printed in the interval between T4 and T5. Before moment T5, "*d*" is received correctly over channel I. While "*b*" is being read from memory $5'II_B$, "*c*" is being transferred from memory $5II_B$ to memory $5'II_B$. As "*d*" is being received correctly at station S–B, switches $t^1_2$ and $t^2_2$ are closed simultaneously so that the abnormal working of the receiver, due to the mutilation of "*a*," has come to an end.

Letter "*c*" is sent to the printer in the proper sequence between moments T5 and T6. While "*c*" is being transferred to the printer Pr2, letter "*d*" remains in memory device $5'I_B$, and signal "*e*" is received mutilated over channel II. Therefore nothing is read again into the storage devices $5II_B$ and $5'II_B$ at this time. Since "*e*" has been detected mutilated, the testing device ST2 opens switches $st^2_2$ and $st^2_1$ at the transmitter of station S–B, thus preventing a new signal being read into memory device $ghnI_B$ by the tape reader Stz2 and the letter which had previously been transmitted from station S–B, to station S–A from memory device $ghnI_B$ is retransmitted to the receiver of station S–A.

Between moments T6 and T7 letter "*f*" is received correctly over channel I and is passed through memory device $5I_B$, via switch $t^1_2$ which has been closed by device ST2, and into memory device $5'I_B$ in that it now has been cleared because switch $Su_2$ has been changed to terminal 1 to read out the "*d*" formerly therein to the printer Pr2.

Between moments T7 and T8, "*e*" is received correctly over channel II and is transferred through memory $5II_B$ via switch $t^2_2$ to memory device $5'II_B$, and switch $Su_2$ is changed to terminal 2, but the letter "*e*" is not read to the printer during this interval since letter "*e*" takes this interval between moments T7 and T8 to fill the memory device $5'II_B$.

Between moments T8 and T9, letter "*g*" is received correctly over channel I and is stored in memory $5I_B$, because switch $t^1_2$ is open since letter "*f*" is still retained in the memory device $5'I_B$, because in the preceding interval between moments T7 and T8, the switch $Su_2$ has been changed to terminal 2. During this interval T8 to T9 letter "*e*" is read from memory $5'II_B$.

At the beginning of the interval T9 to T10, switch $Su_2$ is changed to terminal 1, thus reading the letter "*f*" from memory $5'I_B$ to the printer Pr2. Also during interval 99–T10, letter "*h*" is detected mutilated in channel II and the proper interruption of the keyer Stz2 is ordered by sensing device ST2, so that the signal stored in memory device $ghnII_B$ will be transmitted rather than having a new signal supplied from the tape reader Stz2. Also during the interval T9–T10, switch $t^1_2$ is closed so that letter "*g*" is transferred from memory $5I_B$ to memory $5'I_B$ while the letter "*f*," previously occupying memory $5'I_B$ is being printed.

Between moments T10 and T11 switch $Su_2$ remains at terminal 1, reading the letter "*g*" from memory $5'I_B$ to the printer Pr2. During this interval T10–T11, the letter "*i*" is received correctly over channel I and is transmitted through memory $5I_B$ via closed switch $t^1_2$ into memory device $5'I_B$.

Between moments T11 and T12 the correct letter "*h*" is received (having previously been received mutilated) via channel II and, as the memory bank of channel II is empty, this signal "*h*" is transferred through memory device $5II_B$ via switch $t^1_2$ into device $5'II_B$. During this interval no letter is printed and the switch $Su_2$ was switched from its terminal 1 to 2 at the beginning of this interval.

Between moments T12 and T13 no signal is received over either channel I or channel II according to FIGS. 8 and 8*a*, such as at the end of a message. Switch $Su_2$ is maintained at terminal 2, thereby reading the letter "*h*" from memory $5'II_B$ to the printer Pr2', the letter "*i*" being retained in memory $5'I_B$. Also during the following interval T13 to T14 no signal is received over either channel I or II. At moment T13, however, switch $Su_2$ is changed to its terminal 1 and reads letter "*i*" from memory device $5'I_B$ to the printer Pr2.

Accordingly, in retrospect, the sequence of the signals in any message will change from all the even numbered signals being in channel II and all the odd numbered sequence of signals in channel I when an odd number of mutilations occurs in the message. This is illustrated in FIG. 13 wherein horizontal series 1 and 3 for the two channels of letters show for series 1 the first, third, fourth and sixth letter in channel I, while the second, fifth and seventh letters are in channel II of series 1 so that after the mutilation has been corrected, channel I has the even numbered letters and channel II the odd. However, if an even number of mutilations occurs in a message as shown in series 2 and 4 of FIG. 13, then the odd numbered letters of the signal are in channel I and the even numbered letters or signals are in channel II after the mutilations have been corrected. Thus, in the cases of series 1 and 3 there is a letter in stock in the system after an odd number of mutilations according to the embodiments of this invention shown in FIG. 9.

Thus a two channel type printing telegraph system, embodying two stage memory devices in conjunction with each channel, is capable of rectifying the inversion of logical order produced by repetition of a mutilated signal. Accordingly, the time lost through the repetition process has been reduced in that only the letter multilated has been repeated, and none of the letters, which under existing systems would have been received correctly at the receiving station immediately following a mutilated signal and which would not have been printed because of a blocked printer, need be repeated, since these signals are stored in the memory devices at the receivers and selected therefrom in the proper sequence that they would have been transmitted if no mutilations had occurred.

IV. MODIFICATIONS OF THE NEW SYSTEM

(*a*) *Electronic switching system*

Referring now to FIG. 10 there is disclosed schematically a blocked wiring diagram for a receiver and transmitter at each of two stations S–A and S–B communicating with each other, arranged similarly to that disclosed in FIG. 9, except instead of the mechanical switches of series *st*, *t*, *Si* and *Kv* in the circuit of FIG. 9, there are provided electronic switches indicated in circles carrying the reference characters C1 subs 1 through 8 for the receiver and transmitter of station S–A and C2 subs 1 through 8 for the transmitter and receiver at station S–B.

Also in FIG. 10 there is only shown one dotted line for the communication channels I and II between the receiver and transmitter of each of the two stations, in that actually these channels are not separated as regards to their transmission since they may be determined by one frequency or frequency group in one direction and another frequency or frequency group for the other direction. The repetition means for channel I and II however are separate as indicated by the separate storing or memory devices *ghn*I, *ghn*II, 5I and 5II at each of the stations.

The electronic switching means or electronic relays C1 and C2 shown in circles of FIG. 10, besides being controlled by the sensing or detecting and comparing circuits of devices ST2 and ST1, are also controlled by separate pulses *p* and trigger circuits Tr1, Tr2 and Tr3. For example, the switch $Si_1$ shown in the transmitter of station S–A in FIG. 9 corresponds to the electronic switching device or relay $C1_1$ in the transmitter of station S–A in FIG. 10, which relay is controlled by the trigger $Tr1_A$, which in turn is controlled by pulse $p^1_4$; and similarly in the transmitter of station S–B, electronic relay $C2_1$ is controlled by trigger $Tr1_B$ which in turn is controlled by a pulse $p^2_4$. The switches Kv1 and Kv2 shown in FIG. 9 are controlled respectively in the receivers of stations S–A and S–B by electronic relays $C1_2$ and $C2_2$, which in turn are controlled not only by the corresponding sensing circuit ST1 and ST2 but also by the additional trigger circuits $Tr2_A$ and $Tr2_B$, which triggers in turn are controlled by pulses $p^1_5$ and $p^2_5$. Furthermore an additional or third trigger circuit $Tr3_A$ or $Tr3_B$ is also provided in the connection 23' or 23 between the circuits ST1 or ST2, respectively, for controlling the outgoing electronic switch $C1_5$ or $C2_5$, which corresponds respectively to switches $Su_1$ and $Su_2$ shown in FIG. 9.

Two electronic relays or switching means $C2_3$ and $C2_6$, the letter of which is controlled by a pulse $p^2{}_1$, replace the mechanical switch $t^1{}_2$ shown in FIG. 9 of the receiver of station S–B, and similarly two electronic switches $C2_4$ and $C2_7$, the latter of which is controlled by pulses $p^2{}_2$, are employed to replace the mechanical switch $t^2{}_2$ of FIG. 9 in the receiver of station S–B. Similarly, two pairs of electronic switches are employed in station S–A of FIG. 10 to replace the switches $t^1{}_1$ and $t^2{}_1$ of the receiver in station S–A of FIG. 9.

The connection 24 or 24' between the receiver and transmitter at each station for instigating the request for repetition due to detection of a mutilation, control instead of the two mechanical switches *st* in each transmitter as shown in FIG. 9, control only one electronic switch $C1_8$ or $C2_8$, respectively, which also is controlled by a pulse $p^1{}_3$ or $p^2{}_3$, and instead of also employing switch $st^1{}_2$ or $st^2{}_2$ in FIG. 9, a connection is made to the electronic relay $C1_1$ or $C1_2$ which also provides the switching corresponding to the switch *Si* of FIG. 9.

Schematic block wiring diagrams of the circuits employed for generating the pulses *p* for controlling the triggers T*r*1 and T*r*2 and electronic relays C1 and C2 in the transmitters and receivers in FIG. 10 are shown in FIGS. 14 and 15, respectively.

Referring now to receiver circuit of FIG. 14, its operation is schematically illustrated in the four channel time diagram of FIG. 16, of which only one channel of circuits is shown in FIG. 14, the other three interspersed channels in each channel repetition cycle being shown in the horizontal brackets on line Z*v*1 of FIG. 16. The circuit in FIG. 14 shows a 200 cycle per second multivibrator *mv*200Hz for producing the pulses shown along the top two lines of the time graph of FIG. 16 a seven fold distributor indicated by the blocks Z*v*1 through Z*v*7, and how these blocks of this distributor controls the initiation of two distributor triggers Z*k*V1 and Z*k*V2 which act also as a counting circuit, and in turn control the pulses *p*4 that control the trigger T*r*1. The second circuit Z*v*2 of the seven fold distributor circuit controls pulse *p*3 which triggers the keyer *Stz* of each transmitter (see FIG. 10) after the first element of each signal is read as shown by the pulse along line *p*3 of FIG. 16. The pulses *p*4 and *p*3 occur once each channel repetition cycle for triggering the operation of the transmitter for operation during its assigned channel time as shown by the pulses along lines *p*4 and *p*3 in FIG. 16.

Similarly, the electronic circuit in the receiver of either station S–A or S–B of FIG. 10 for its corresponding controlling pulses and trigger T*r*3 is shown in the schematic wiring diagram of FIG. 15, the operation of which is shown in the time diagram of FIG. 17, which also is provided for a four channel system in which the channels bracketed along line O*v*1 near the top of the diagram are not considered part of the circuit of FIG. 15. Corresponding with time diagrams of FIGS. 7 and 8 the signal for each of the four channels is received at the end of a four channel repetition cycle and demodulated during the whole of following four channel cycle as shown for the seven numbered elements along the line Rec. and the stepped horizontal lines P*rv*1 through 7 in time diagram of FIG. 17. The circuits shown in FIG. 15 include a seven fold distributor O*v*1 through O*v*7, the first two circuits of which control, respectively, (1) the distribution triggers O*k*V1 and O*k*V2 for controlling pulse *p*5 for the trigger T*r*2 (which in turn controls the pulses *p*1 and *p*2), and (2) the seven fold printer distributor *prv*1 through *prv*7 for producing the "start," five intelligence elements, and the stop element of the printed signal under the control of a 50 cycle per second multivibrator *mv*50Hz which spreads out the received radio signals over one whole channel repetition cycle for each communication channel at its separate receiver.

Thus, the controlling triggers T*r*1 and T*r*2 and pulses p for the circuit of FIG. 10 are synchronized by pulses originating from a central rythmic organ, namely the multivibrators shown in the circuits of FIGS. 14 and 15, which control pulses according to the time moments T1 through T14 and so on as shown in the time diagrams of FIGS. 8 and 9.

The trigger T*r*3, however, is controlled as are the switches $Su_1$ and $Su_2$ of FIG. 9, by the sensing circuits ST1 and ST2, respectively, in that they depend upon these sensing devices for realizing the proper operating program and withdrawal of the signals in the proper sequence in the event mutilation has occurred which upsets the sequence in the storing circuits as described previously.

The rotation of the pair of distributors Z*k*V1 and Z*k*V2 in FIG. 14 and the pair of distributors O*k*V1 and O*k*V2 in FIG. 15 provide the rotation corresponding to the two channels I and II into which each message transmitted has its alternate signals divided and assigned.

One of the pulses *p*1 and *p*2 of the receiving circuit shown on the time diagram of FIG. 17, is alternately suppressed as determined by the state of the channel trigger T*r*2 in that these pulses *p*1 and *p*2 correspond to the operation of the switches *t*1 and *t*2 between the memory circuit 5I and 5'I and 5II and 5'II of FIG. 9. Thus in the case of a mutilation, both of these pulses *p*1 and *p*2 may appear together as shown by the switches $t^1{}_2$ and $t^2{}_2$ in FIGS. 7 and 8.

The comparator circuit shown in FIG. 18, which is incorporated in the devices ST1 and ST2 in FIGS. 9 and 10, compares the signals of storing devices 5I or 5II with 5'I or 5'II, respectively, the connections for which are shown in FIG. 10 by the conductors 25 and 26 for the receiver of station S–B and conductors 25' and 26' for the station S–A. Thus, if the comparison is the same, no voltage appears in any of the square rectifier circuits shown in FIG. 18 to control the relay ST of FIG. 18, and a repetition cycle is started. In the case of a difference, then normal operation occurs.

*(b) A system of increased storage capacity*

It should be noted, however, according to this system of dividing a message into two channels, and storage banks for two signals of each channel, that three identical signals cannot be transmitted in any message without producing a mutilation operation. However, since this rarely occurs, i.e. that three letters in any word or message are exactly the same which cannot be spaced by a dash dot or other symbol, this situation would rarely occur.

Referring now to FIG. 11 there is shown a schematic wiring diagram similar to that shown in FIG. 9 with a transmitter and receiver at each station S–A and S–B and corresponding block circuits carrying corresponding similar reference characters. The major difference in this circuit from FIG. 9 however results from the fact that instead of having two pairs of storing circuits 5I and 5II, two additional storing circuits are provided so that a larger plurality of signals may be stored and scanned in each receiver and further avoid the necessity of blocking signals if two or more mutilations successively occurred in the same channel. The additional storage capacity is shown by the memory devices 5*a*, 5*b*, 5*c* and 5*d* in each receiver which are fed correspondingly by the first storing devices 5I and 5II, respectively, in which each of the four storing devices replace the former two storing devices 5'I and 5'II of the circuits of FIGS. 9 and 10.

The operation of this circuit, in comparison with that of FIGS. 9 and 10, may be more clearly understood by the time diagrams of FIG. 12 in which vertical and horizontal series 2 correspond to the operation of the system according to FIGS. 9 and 10 in which more than one mutilation occurs in succession for the same letter in the same channel for which a blocking circuit would have to be provided for any intermediately correctly received letters for which there would be no storage capacity. Such blocked letters are shown by the squares around the X's in the vertical diagram 2 and around the *d*'s in the horizontal series 2 in FIG. 12. Thus when three such successive mutilations occur, two signal spaces are lost in the additional required repetition cycle time which is not the case for the system of FIG. 11 having four receiver storing devices and no blocking of the signals is required as illustrated in the vertical and horizontal series 1 in FIG. 12.

There is also shown in FIG. 11, as in FIGS. 9 and 10, connections for successive pairs of pulses $\alpha$ and $\beta$ as idle time signals fed to the code converters $5/7_A$ and $5/7_B$ in each of the transmitters at each station S–A and S–B, respectively. These idle time signals are required in the event a message is transmitted from one station to the other and not in the reverse direction, and a complete two way system of signals is necessary for the proper operation of this invention so that mutilation indications and repetition requests may be properly made. Since each message is divided between two channels, two idle time signals $\alpha$ and $\beta$ which alternate in pairs are required to prevent continuous mutilation indications or requests for repetition when only idle time is being transmitted.

While there is described above the principles of this invention in connection with specific apparatus, it is to be clearly understood that this description is made only by way of example and not as a limitation to the scope of this invention.

What is claimed is:

1. A type printing telegraph system for two way radio traffic operative between two stations, comprising: means connected to each message receiving station for detecting mutilated signals, automatic means connected to each station for repeating the signal which was detected as being mutilated, storage means connected to each message receiving station for retaining signals received between reception of said mutilated signal and repetition of said mutilated signal, and means connected to each said storage means for selecting the signals stored in the order they would be received from the transmitter if no mutilation had occurred.

2. A system according to claim 1 comprising at least two separate channels of radio transmission for the sending of a message including means connected to each message sending station for sending successive signals of said message on alternate channels, and means connected to each message receiving station for associating each signal with the channel in which it was transmitted.

3. A system according to claim 2 wherein said automatic repeating means includes means connected to said detecting means for repeating the last signal transmitted from that station over the same channel as the mutilation was detected for requesting the repetition of the signal received mutilated.

4. An automatic mutilation correction system for a two way telecommunication system of signals between two stations each having a receiver and a transmitter for said signals, comprising: means connected to each transmitter for storing a plurality of successive signals as they are transmitted; means connected to each transmitter storing means for receiving said stored signals in a given sequence for transmission, means connected to each receiver for storing a plurality of signals before they are removed from that receiver, means connected to each receiver and its corresponding receiver storing means for detecting mutilation of received signals and for comparing received signals with stored signals, means connected to said detecting and comparing means for determining which signal is to be repeated from the associated transmitter storing means at the same station for requesting a repetition of a detected mutilated signal, and further means connected to said detecting and comparing means for selecting stored signals for removal from said receiver storing means in the same sequence as said signals were given to the transmitter storing means at the other station from which they were transmitted regardless of signal repetitions for correcting of mutilations.

5. A system according to claim 4 including means connected to each transmitter for transmitting a message of a plurality of signals over at least two separate channels, means connected to said transmitting means for transmitting adjacent signals of said message over different channels, and means connected to each receiver for associating each signal received with the channel over which it was transmitted, whereby repetition of a mutilated signal may be detected without a special repetition indication signal.

6. A system according to claim 5 wherein said means for determining which signal is to be repeated for requesting a repetition of a mutilated signal includes means for re-transmitting the last signal transmitted in the same channel in which the mutilated signal was transmitted and detected.

7. A two-way signal communication system between two stations having means for automatically correcting mutilated signals by repetition thereof, comprising: a transmitter and a receiver at each station, means connected to each receiver for detecting mutilation of a received signal, means connected to the transmitter and to said mutilation detecting means at the same station for causing that transmitter to repeat a signal it previously transmitted, means connected to each receiver for detecting repetition of a signal, means connected to each transmitter and to said repetition detecting means at its same station for repeating the transmission of the signal mutilated, means connected to each transmitter for storing each signal transmitted, means connected to each receiver for storing each unmutilated signal received, means connected to each receiver and to the storing means at that receiver for removing said stored signals, and switching means connected to said detecting means and said storing means at each station for determining the proper sequence of the signals to be removed from said receiver.

8. A system according to claim 7 including means for producing at least two separate channels of radio transmission for each message, means connected to each receiver for alternately transmitting successive signals of a given message on different channels, and means connected to each receiver for associating each signal received with its transmitted channel.

9. A system according to claim 8 wherein said transmission repeating means comprises means for transmitting the last signal transmitted over that same channel associated with the signal that was mutilated.

10. A system according to claim 8 wherein said storing means at each receiver comprises at least two storing devices for separate signals corresponding to each channel.

11. A system according to claim 7 wherein said switching means comprises electronic switching circuits.

12. A system according to claim 7 wherein each of said signals comprises a plurality of mark and space type elements and the ratio of the number of mark elements to the number of space elements in each signal is identical, and wherein said mutilation detecting means comprises means for detecting the mark/space ratio of each signal.

References Cited in the file of this patent

UNITED STATES PATENTS 2,706,215 Van Duuren ------------ Apr. 12, 1955